(12) United States Patent
Havaldar et al.

(10) Patent No.: US 8,279,228 B2
(45) Date of Patent: Oct. 2, 2012

(54) PERFORMANCE DRIVEN FACIAL ANIMATION

(75) Inventors: Parag Havaldar, Cerritos, CA (US); Mark Sagar, Auckland (NZ); Josh Ochoa, Hermosa Beach, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

(21) Appl. No.: 12/986,095

(22) Filed: Jan. 6, 2011

(65) Prior Publication Data

US 2011/0175921 A1    Jul. 21, 2011

Related U.S. Application Data

(63) Continuation of application No. 12/424,481, filed on Apr. 15, 2009, now abandoned, which is a continuation of application No. 12/198,762, filed on Aug. 26, 2008, now abandoned, which is a continuation of application No. 11/956,728, filed on Dec. 14, 2007, now abandoned, which is a continuation of application No. 11/739,448, filed on Apr. 24, 2007, now abandoned.

(60) Provisional application No. 60/794,790, filed on Apr. 24, 2006.

(51) Int. Cl.
*G06T 13/00* (2011.01)
(52) U.S. Cl. .................................................... 345/473
(58) Field of Classification Search .................. None
See application file for complete search history.

(56) References Cited

U.S. PATENT DOCUMENTS

| | | | |
|---|---|---|---|
| 6,163,322 A | 12/2000 | LaChapelle | |
| 6,232,965 B1 | 5/2001 | Scott et al. | |
| 6,285,794 B1 * | 9/2001 | Georgiev et al. | 382/243 |
| 6,735,566 B1 | 5/2004 | Brand | |

(Continued)

FOREIGN PATENT DOCUMENTS

WO    03049039    6/2003

OTHER PUBLICATIONS

Cyriaque Kouadio et al., "Real-Time Facial Animation based upon a Bank of 3D Facial Expressions", www.iro.umontreal.ca/labs/infographie/papers/Kouadio-1998-RTFA/Kouadio-1998-RTFA.pdf.

(Continued)

*Primary Examiner* — Kee M Tung
*Assistant Examiner* — Carlos Perromat
(74) *Attorney, Agent, or Firm* — Samuel S. Lee; Procopio, Cory, Hargreaves & Savitch LLP

(57) ABSTRACT

A method of animating a digital facial model, the method including: defining a plurality of action units; calibrating each action unit of the plurality of action units via an actor's performance; capturing first facial pose data; determining a plurality of weights, each weight of the plurality of weights uniquely corresponding to the each action unit, the plurality of weights characterizing a weighted combination of the plurality of action units, the weighted combination approximating the first facial pose data; generating a weighted activation by combining the results of applying the each weight to the each action unit; applying the weighted activation to the digital facial model; and recalibrating at least one action unit of the plurality of action units using input user adjustments to the weighted activation.

22 Claims, 12 Drawing Sheets

U.S. PATENT DOCUMENTS

| | | |
|---|---|---|
| 7,068,277 B2 | 6/2006 | Menache |
| 2004/0095352 A1 | 5/2004 | Huang |
| 2004/0179013 A1 | 9/2004 | Menache |
| 2005/0248582 A1 | 11/2005 | Scheepers et al. |
| 2006/0071934 A1 | 4/2006 | Sagar et al. |

OTHER PUBLICATIONS

Jin-xiang Chal et al., "Vision-based Control of 3D Facial Animation", The Eurographics Association 2003, graphics.cs.cmu.edu/projects/face-animation/face-low.pdf.

V. Blanz et al., "Reanimating faces in images and video", In Proc. of Eurographics, 2003.

George Borshukov et al., "Universal Capture; Image-based Facial Animation for "The Matrix Reloaded"", In Proceedings of SIGGRAPH Conference on Sketches & applications, ACM Press, 2003.

E. Chuang et al., Performance driven facial animation using blendshape interpolation. CSTR-2002-02, Department of Computer Science, Stanford University 2002.

Cosker, D.P et al., Speech-driven facial animation using a hierarchical model, VISP (151), No. 4, Aug. 2004, pp. 314-321.

Paul Debevec et al., Acquiring the reflectance field of a human face, In SIGGRAPH 2000 Conference Proceedings, pp. 35-42, ACM SIGGRAPH, Jul. 2000.

Eisert, P., et al. 1997. "Model-based facial expression parameters from image sequences", In Proceedings of the IEEE International Conference on Image Processing (ICIP-97), 418-421.

P. Ekman et al., "Manual for facial action coding system", Research Nexus division of Network Information Research Corporation, 2002.

I.A. Essa et al., "Pentland Facial expression recognition using a dynamic model and motion energy", Proc. IEEE Int'l Conference on Computer Vision, pp. 360-367, 1995.

Theobald, B.J. et al., "Towards a low bandwidth talking face using appearnce models", IVC (21), No. 12-13, Dec. 2003, pp. 1117-1124.

Tim Hawkins et al., "Animatable facial reflectance fields", In Rendering Techniques 2004: 15th Eurographics Workshop on Rendering, pp. 309-320, Jun. 2004.

Jensen H.W. et al., 2001, "A practical model for subsurface light transport", Proceedings of SIGGRAPH 2001, 511-516.

Jensen H. W. et al., "A Rapid Hierarchical Rendering Technique for translucent materials", In Proceedings of SIGGRAPH 2005.

Jun-yong Noh et al., "Expression cloning", In Proceedings of ACM SIGGRAPH 2001, Computer Graphics Proceedings, Annual Conference Series, pp. 277-288, Aug. 2001.

Mark Sagar, Reflectance Field Rendering of Human Faces for "Spiderman 2", SIGGRAPH 2004.

D. Terzopoulos et al., "Techniques for realistic facial modeling and animation", In Nadia Magenat Thalmann and Daniel Thalmann, editors, Computer Animation 91, pp. 59-74, Springer-Verlag, Tokyo, 1991.

Li Zhang et al., "Spacetime faces: high resolution capture for modeling and animation", ACM Trans. Graph., 23 (3):548-558, 2004.

Carranza, Joel et al., "Free-viewpoint video of human actors", In ACM Transactions on Graphics (TOG), vol. 22, Issue 3, Jul. 2003. Proceedings of ACM SIGGRAPH 2003—SESSION: Human bodies, p. 569-577. [retrieved on Oct. 24, 2007.] Retrieved from the Internet: <URL: http://graphics.tu-bs.de/people/magnor/publications/sig03.pdf>.

International Search Report and Written Opinion issued in PCT/US07/67321 on Feb. 14, 2008.

Quigshan Zhang et al: "Geometry-Driven Photorealistic Facial Expression Synthesis", Eurographics/Siggraph Symposium on Computer Animation, Jan. 1, 2003.

Extended European Search Report issued in corresponding European Patent Application No. 07761211.7, Jan. 19, 2010.

* cited by examiner

PERFORMANCE DRIVEN FACIAL ANIMATION

CROSS-REFERENCE TO RELATED APPLICATIONS

This application is a continuation application of U.S. patent application Ser. No. 12/424,481, filed Apr. 15, 2009 now abandoned entitled "PERFORMANCE DRIVEN FACIAL ANIMATION", which is a continuation application of U.S. patent application Ser. No. 12/198,762, filed Aug. 26, 2008 now abandoned entitled "PERFORMANCE DRIVEN FACIAL ANIMATION", which is a continuation application of U.S. patent application Ser. No. 11/956,728, filed Dec. 14, 2007 now abandoned entitled "PERFORMANCE DRIVEN FACIAL ANIMATION", which is a continuation application of U.S. patent application Ser. No. 11/739,448, filed Apr. 24, 2007 now abandoned, entitled "PERFORMANCE DRIVEN FACIAL ANIMATION", which claimed the benefit of priority of U.S. Provisional Patent Application Ser. No. 60/794,790, filed Apr. 24, 2006, entitled "PERFORMANCE DRIVEN FACIAL ANIMATION." The disclosures of the above-referenced patent application are incorporated herein by reference.

BACKGROUND

1. Field of the Invention

The present invention relates generally to motion capture, and more particularly to methods and systems for generating facial animation using performance data, such as motion capture data obtained from motion capture systems and video images obtained from video data.

2. Description of the Prior Art

Modeling a face, its motion, and rendering it in a manner that appears realistic is a difficult problem, though progress to achieve realistic looking faces has been made from a modeling perspective as well as a rendering perspective. A greater problem is animating a digital face in a realistic and believable manner that will bear close scrutiny, where slight flaws in the animated performance are often unacceptable. While adequate facial animation (stylized and realistic) can be attempted via traditional keyframe techniques by skilled animators, it is a complicated task that becomes especially time-consuming as the desired results approach realistic imagery.

Apart from keyframe techniques, other methods based on principal component analysis have also been implemented to develop animated facial models from performance data. These methods typically generate lowest-dimensional models from the data. Further, being mathematically-based solutions, the facial models so developed often look unnatural in one or more aspects. Moreover, the resulting low dimensionality makes post-development modification of the facial model difficult and non-intuitive to a user when the principal components do not correspond with natural, identifiable facial movements that can be adjusted to achieve a desired result. That is, the basis vectors (obtained using principal component analysis) do not correspond to any logical expression subset that an artist can edit afterwards. For example, a simultaneous lip corner rise with eyebrow rise might be solved from performance data as single component activation. However, the single component activation may not be decoupled into separate activations for the lip corner and eyebrow. Thus, an animator wishing to adjust only the lip corner rise may be unable to do so without also activating the eyebrow component.

Therefore, what is needed is a system and method that overcomes these significant problems found in the conventional systems as described above.

SUMMARY

The present invention provides methods and systems for generating facial animation using performance data, such as motion capture data obtained from motion capture systems and video images obtained from video data.

In one aspect, a method of animating a digital facial model is disclosed. The method includes: defining a plurality of action units; calibrating each action unit of the plurality of action units via an actor's performance; capturing first facial pose data; determining a plurality of weights, each weight of the plurality of weights uniquely corresponding to the each action unit, the plurality of weights characterizing a weighted combination of the plurality of action units, the weighted combination approximating the first facial pose data; generating a weighted activation by combining the results of applying the each weight to the each action unit; applying the weighted activation to the digital facial model; and recalibrating at least one action unit of the plurality of action units using input user adjustments to the weighted activation.

In another aspect, a method of animating a digital facial model includes: defining a plurality of action units, each action unit of including first facial pose data and an activation; calibrating the first facial pose data using calibration pose data derived from a plurality of captured calibration performances, each calibration performance of the plurality of captured calibration performances corresponding with the each action unit; deriving second facial pose data from another calibration performance of the plurality of captured calibration performances; determining a plurality of weights, each weight of the plurality of weights uniquely corresponding to the each action unit, the plurality of weights characterizing a weighted combination of the facial pose data, the weighted combination approximating the second facial pose data; generating a weighted activation by combining the results of applying the each weight to the activation; applying the weighted activation to the digital facial model; and recalibrating the first facial pose data and the activation using input user adjustments to the weighted activation.

In yet another aspect, a system for retargeting facial motion capture data to a digital facial model is disclosed. The system includes: a FACS module to manage a plurality of action units; a retargeting module to generate at least one weighted activation for the digital facial model using the facial motion capture data and the plurality of action units; an animation module to generate a facial animation frame by applying the at least one weighted activation to the digital facial model; and a tuning interface module to generate recalibrated action units for the FACS module in accordance with input user adjustments to the facial animation.

In a further aspect, a method of digital facial animation includes: capturing facial motion data; labeling the facial motion data; stabilizing the facial motion data; cleaning the facial motion data using a FACS matrix; normalizing the facial motion data; retargeting the facial motion data onto a digital facial model using the FACS matrix; and performing multidimensional tuning of the FACS matrix.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which.

DETAILED DESCRIPTION

Figure 1:
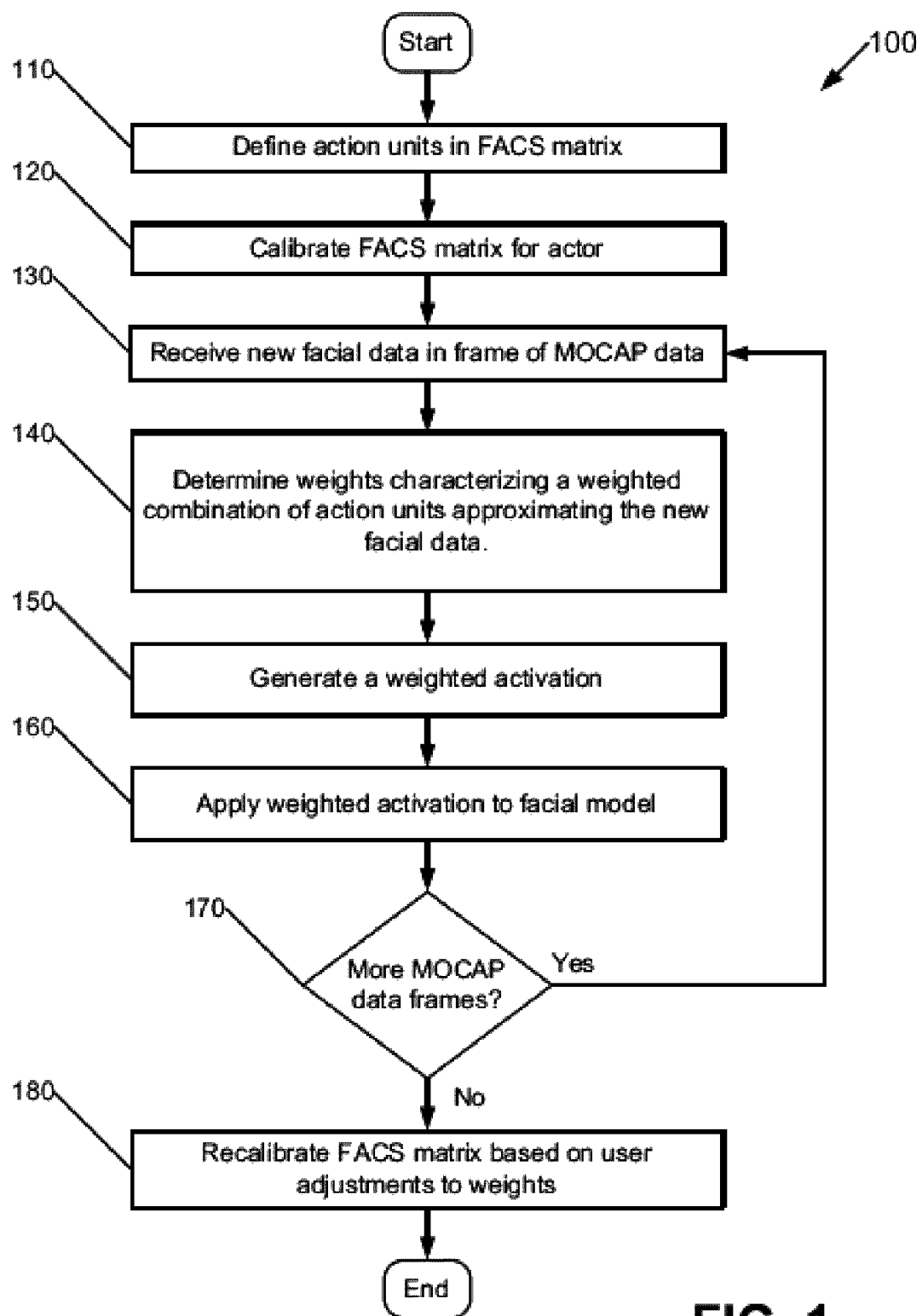
FIG. 1 is a flowchart illustrating a method of animating a digital facial model.

Certain implementations as disclosed herein provide for systems and methods to implement a technique for capturing motion of one or more actors or objects. For example, one method as disclosed herein utilizes a motion capture ("MOCAP") system to capture the body and facial motion and surfaces of multiple actors using cameras and optical markers attached to the actors. The MOCAP system builds data from the captured images to use in animation in a film.

Features provided in implementations include, but are not limited to, cleaning and stabilizing facial data using a Facial Action Coding System (FACS) regardless of the capturing medium, including normal low/high resolution video and MOCAP, for example; facial animation using FACS; and multidimensional tuning of FACS action units. The FACS, proposed by Paul Eckmann and Wallace Friesen, and based on a library of well-studied facial expression set from psychology, has been the basis of driving computer graphics (CG) models.

After reading this description it will become apparent to one skilled in the art how to practice the invention in various alternative implementations and alternative applications. However, although various implementations of the present invention will be described herein, it is understood that these embodiments are presented by way of example only, and not limitation. As such, this detailed description of various alternative implementations should not be construed to limit the scope or breadth of the present invention as set forth in the appended claims.

When an exact replica of an actor's performance is desired, many processes work by tracking features on the actor's face and using information derived from these tracked features to directly drive the digital character. These features include, for example, use of a few marker samples, curves or contours on the face, and a deforming surface of the face. These processes are intended to programmatically translate data derived from the performance of an act to animations on a digital computer graphics ("CG") face. The success of these processes often depends on the quality of data, the exactness and realness required in the final animation, and facial calibration. The expertise of both artists (trackers, facial riggers, technical animators) and software technology experts is also often required to achieve a desired end product. Setting up a facial processing pipeline to ultimately produce hundreds of shots of many actors' performances, captured simultaneously, and requiring inputs and controls from artists and animators, presents significant further challenges.

A performance will be understood to be a visual capture of an actor's face. In most instances, the actor is talking and emoting either individually or in a group with other actors. This is often done by capturing a video performance of the actor. The video frames can be used either purely for reference by an animator, for further processing to extract point samples, or for deforming 3-D surfaces which are then retargeted onto a digital facial model. Various technological hurdles must be overcome before the 2-D or 3-D reconstructed data can be used, including calibrating cameras, tracking points, and reconstructing 3-D information.

Other media types such as audio have been used to capture a voice performance and drive digital facial models. Most of the work approximates the lip and mouth movement of lines of speech but does not have explicit information relating to other areas of the face such as brows, eyes, and the overall emotion of the character. These attributes have to be either implicitly derived or added during post-processing. In one implementation, facial puppeteering has been used to drive a digital facial model. In another implementation, a control device such as a cyber glove is used to input control commands, and finger movements are retargeted onto the digital facial model.

While these forms of capture for driving a digital facial model have yielded results, a common mode of data for driving a facial animation has been optical data, used to reconstruct certain facial feature points that are retargeted onto a digital facial model.

There are different ways in which the facial expressions can be captured. In one implementation, the MOCAP system captures data of the body and face together. The facial data are targeted onto an animated character whose face is stylized and does not conform to the face of the actual actor. In another implementation, the images are directed toward producing a realistic animation on a character that is intended to look real, and its face to perform realistically. In a further implementation, the facial MOCAP data are acquired separately in a sitting position and the facial animation generated is blended in keyframed body shots.

Making data-driven facial animation work well is a challenge because there are many requirements that produce varying levels of data quality including the different types of systems used, the number of people simultaneously captured, and the nature of facial only versus face and body capture. The MOCAP system can support multiple approaches and so can be adapted to these, and other, various production requirements.

In one implementation, face and body motion are captured simultaneously with multiple cameras (e.g., 200 cameras) positioned about a "capture volume." An example capture volume is about 20 feet×20 feet×16 feet in length, width, and height, respectively. Multiple infrared markers (e.g., 80 markers) are coupled to an actor's face and used to capture the actor's performance. It will be appreciated that other configurations of cameras, capture volumes, and markers can be used. The captured data are reconstructed in 3-D using the positions of the multiple cameras during post-processing. A tool such as IMAGEWORKS™ proprietary IMAGEMOTION™ technology, adapted to capturing and processing MOCAP data, can be used. The number of actors acting in motion capture volume can vary from low to high numbers depending on size of the volume, camera resolutions, strength of optical lights and signals, and other related parameters.

Figure 5:
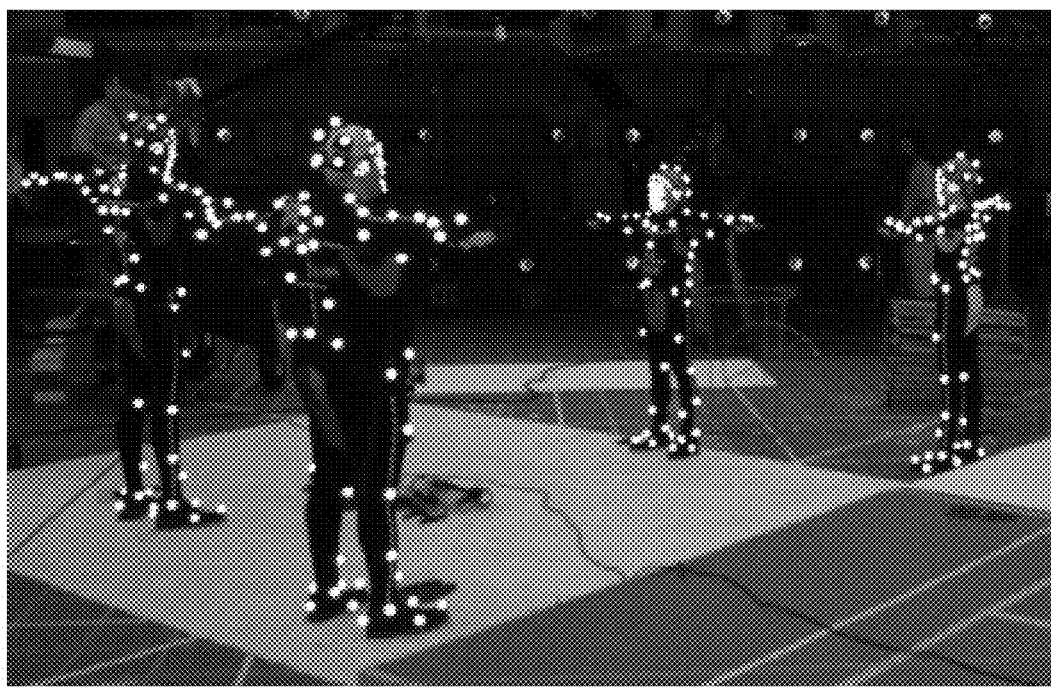
FIG. 5 is an image of actors on a motion capture set.

During a typical MOCAP session, all the actors are instructed to stand apart. Each actor then individually performs a standard T-pose position, where the legs are placed together, hands are stretched out, and the face is relaxed to a neutral position. The T-pose is useful for search and standardization purposes for both the body and face in the MOCAP data during post-processing. Also, each MOCAP "take" ends in all the actors returning to the standard T-pose in the capture volume with the face back to the relaxed neutral position. The T-pose is used by the facial pipeline in a normalization process to ensure that marker placements on a second day of MOCAP performances, for example, correspond to those on the day of the calibration (also referred to as the "master T-pose"). FIG. 5 depicts actors each performing a T-pose in a capture volume. In another instance of a motion capture adaptation (known as an ADR session), only one actor is acting in a sit down position with sensors looking at the actors face. In such cases a T-Pose would correspond to a neutral pose of the face only with no body position.

According to a Facial Action Coding System ("FACS"), the human face has muscles that work together in groups called "actions units." A FACS provides a framework for determining when certain action units are triggered and how to assign to each action unit a relative influence in a facial pose. The FACS was initially designed for psychologists and behavioral scientists to understand facial expressiveness and behavior, though it has also been adapted to other areas.

Facial expressions have been categorized into 72 distinct action units. Each action unit defines a muscular activity ("activation") that produces a momentary change in facial appearance. These changes in facial appearance vary from person to person depending on facial anatomy, e.g., bone structure, fatty deposits, wrinkles, the shapes of various facial features, and other related facial appearances. However, certain commonalities are seen between people as these action units are triggered. An action unit used in a FACS is based on the location on the face of the facial action, and the type of facial action involved. For example, the upper face has muscles that affect the eyebrows, forehead, and eyelids; the lower muscles around the mouth and lips form another group. Each of these muscles works in groups to form action units; and these action units can be broken down further into left and right areas of the face, which can be triggered asymmetrically and independently of each other. In general, all the action units suggested by a FACS provide a broad basis for dynamic facial expressions that can be used in CG animation.

A motion capture system may use a FACS as a foundation for capturing and retargeting facial MOCAP data on an animated character's face. Prior to a MOCAP performance, each actor performs a series of calibration poses that include extreme versions of all the action units. The reconstructed 3-D facial pose data corresponding to an action unit capture the extreme facial expression used by the actor to perform that action unit. In one implementation, the FACS includes 64 poses, some of which are split into left and right positions. In another implementation, 18 phoneme poses corresponding to articulated phonemes are also included.

Figure 6A:
FIG. 6A is a three-part image depicting a neutral facial pose.
Figure 6B:
FIG. 6B is a three-part image depicting a brow lowering facial pose.
Figure 6C:
FIG. 6C is a three-part image depicting a lip corner pull facial pose.
Figure 7A:
FIG. 7A is a three-part image depicting a mouth stretch facial pose.
Figure 7B:
FIG. 7B is a three-part image depicting a lip stretch facial pose.

FIGS. 6A-6C and 7A-7B illustrate a few of the action units used in the MOCAP system based on FACS. As discussed above, FACS proposes upwards of 72 action units that include expressions involving facial muscles and head motion. FIG. 6A is a three-part image depicting a neutral facial pose; FIG. 6B is a three-part image depicting a brow lowering facial pose; FIG. 6C is a three-part image depicting a lip corner pull facial pose; FIG. 7A is a three-part image depicting a mouth stretch facial pose; and FIG. 7B is a three-part image depicting a lip stretch facial pose. In each of FIGS. 6A-6C and 7A-7B, the actual FACS reference, the actor's performance, and the retargeted expression on the character are shown from left to right.

As discussed above, in one implementation, data capture is performed using an optical system capturing both body and face motion of one or more actors performing in a capture space. This implementation uses passive optical components including infrared cameras to capture infrared light reflected by the markers. An image so captured is a low entropy image comprising mostly black areas where no infrared light is sensed, and white dots representing the reflective markers. The size of a white dot in the image varies depending on whether the dot is a body marker (large) or face marker (small), on the distance of the actor (and hence the marker) from the camera, and on whether any occlusions have occurred, where the occlusions are usually caused by the actors.

The low entropy images provide at least two advantages: (1) the cameras can capture and record images at higher definitions and at higher frame rates, typically at 60 Hz; and (2) 3-D reconstruction of the captured marker data triangulates each marker across multiple images with different viewpoints to locate the marker in space. The ability to associate corresponding points automatically is greatly improved by using only white dots on a black background.

Figure 8:
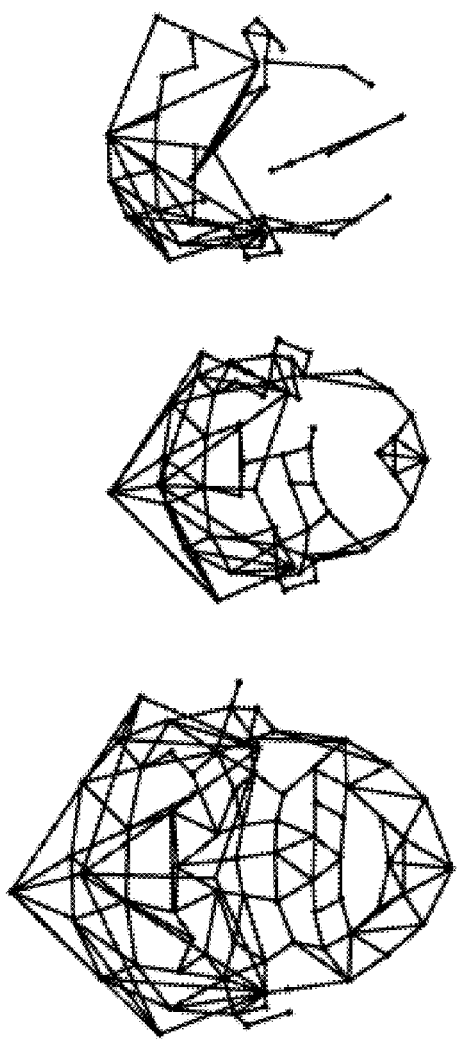
FIG. 8 is a three-part image depicting variability in facial motion capture data quality.

After 3-D reconstruction, the markers are represented by spatial positions (i.e., x, y, z) in a plurality of data frames. However, the data are often noisy, do not have temporal associativity (i.e., consistent labeling) across all of the data frames, and may have gaps. FIG. 8 is a three-part image depicting variability in facial motion capture data quality. Shown in the left-most part of FIG. 8 is an example of good quality data. Shown in the middle part of FIG. 8 is an example of lower quality data. And, shown in the right-most part of FIG. 8 is an example of poor quality data. These problems can be addressed in a learning-based approach taking information both from a facial data model and the temporal associativity of the data.

The markers reconstructed for each data frame can have both body markers and facial markers. Both the body markers and facial markers require labeling prior to facial data processing. That is, each marker is assigned a unique identification that persists across the data frames. Labeling all body and facial markers according to their trajectories is a cumbersome and error prone process, especially when a large number of markers is visible in the volume. In one implementation, a two-step process based on the size disparity between body markers (larger) and facial markers (smaller) is used. First, 3-D reconstruction is performed where facial markers are ignored and only body markers are reconstructed and labeled, usually according to velocity-based constraints. Next, the 3-D reconstruction is performed to acquire facial markers, but which will usually also capture body markers. The body markers are removed by eliminating all markers labeled in the first step, leaving only facial data remaining. In another implementation, labeling the facial markers is automated based on a library of action units (a "FACS matrix") specifically tailored to the corresponding actor's face.

During a performance, the actor is typically moving around in the capture volume. The movements result in a translation of the face markers in accompaniment with the body while the actor is speaking and emoting. To retarget the facial marker data onto a digital facial model, it is beneficial to stabilize the facial data by nullifying the translational and rotational effects of body and head movements. Particular difficulties arise with respect to stabilization because facial markers do not necessarily undergo a rigid transform to a standard position as the actor performs. Rigid movements are caused by head rotations and the actor's motion, but when the actor emotes and speaks, many of the facial markers change positions away from their rigid predictions. A few stable point correspondences are typically sufficient to solve for an inverse transformation. However, it is frequently difficult to determine on a frame-by-frame basis which markers are relatively stable, having undergone only a rigid transformation, and which have not been subject to other movements related to emoting or speaking. Noise in the 3-D reconstructed positions of the markers can further impede the determination of a rigid transformation.

In one implementation, a hierarchical solution is invoked by first performing a global (or gross) stabilization using markers that generally do not move due to facial expressions, such as markers coupled to the head, ears and the nose bone. The solution is then refined with a local (or fine) stabilization by determining marker movements relative to a facial surface model.

After the facial data have been stabilized, the facial data may be missing markers due to occlusions, lack of visibility in the cameras, noise caused by errors in 3-D reconstructions, and/or mislabeled markers. In one implementation, a cleaning and filtering tool is used which includes a learning system based on good facial model data. The cleaning and filtering tool generates estimates of the positions of missing markers, removes noise, and in general ensures the viability of all the markers. The system is scalable to handle data generated by wide ranges of facial expression, and can be tuned to modify the dynamics of the facial data.

The cleaning tool utilizes the underlying FACS theory to organize markers into groups of muscles. Muscle movements can be used to probabilistically estimate the likely positions of missing markers. A missing marker location is estimated spatially in a neighborhood points, and estimated temporally by analyzing ranges of motion of the markers. In one implementation, a probabilistic model and a corresponding marker muscle grouping are tuned to each actor.

Once all the marker positions are determined (or estimated), standard frequency transforms are used to remove noise in the data. It will be appreciated that high frequency content, which is normally categorized as noise, may also represent quick, valid movements of the actor's muscles and changes in the actor's facial expression.

When capturing a long performance, such as a movie spanning over more than one day, actors typically remove and reattach motion capture markers. Although steps are taken to ensure that the markers are placed at the same positions on the face each time, small differences between marker placements at the daily positions are common. These differences can significantly affect the retargeting solutions described below. Normalization is therefore an important component of adjusting the marker placements so that the differences in the daily positions do not compromise the extent of facial expression performed by the actor, and the facial expression is accurately transferred onto the digital facial model.

In one implementation, normalization is accomplished in two steps. Each MOCAP take starts and ends with the actors performing a T-pose, as discussed in relation to FIG. 5. The T-pose of each actor in a subsequent MOCAP take is aligned with the master T-pose of the actor determined during calibration. Aligning a T-pose to the master T-pose relies on the use of various relaxed landmark markers. For example, the corners of the eyes and mouth are used because they are expected to change very little from day to day. Offset vectors for each marker are computed according to discrepancies in the alignment of the T-pose and master T-pose. The offset vectors are applied to the T-pose of the corresponding MOCAP take so that each marker in the T-pose is identically aligned to the markers of the master T-pose. The offsets are propagated through the actor's performance during that day, thus normalizing the data in all the frames.

As discussed above, a FACS provides a set of action units or poses deemed representative of most facial expressions. In one implementation, MOCAP frames of calibration poses performed by an actor relating to facial expressions corresponding to FACS poses (i.e., action units) are captured. Some of the calibration poses are broken into left and right sides to capture an asymmetry that the actor's face may exhibit. Subsequently, incoming frames of the actor's performance are analyzed in the space of all the FACS poses (i.e., action units) of the FACS matrix. The action units may thus be viewed as facial basis vectors, and a weight for each is computed for an incoming data frame. A weighted combination of action units (i.e., facial basis vectors, FACS poses) is determined to approximate a new pose in an incoming data frame.

Figure 9:
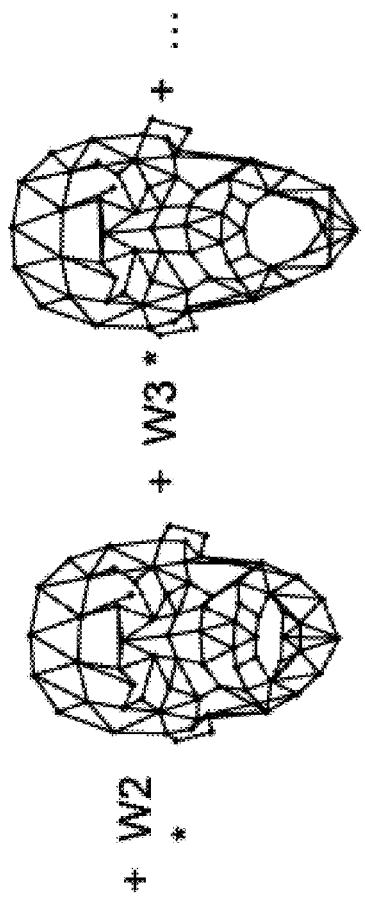
FIG. 9 illustrates an example computation of weights for a weighted combination of FACS poses.
Figure 9:
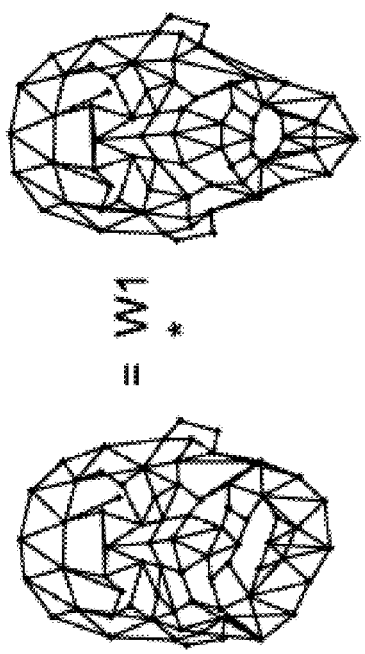

FIG. 9 illustrates an example computation of weights $w_1$, $w_2 \ldots w_n$ for a weighted combination of FACS poses. Computing weights $w_1, w_2 \ldots w_n$ determines an influence associated with each of n FACS action units. In one implementation, computing the weights includes a linear optimization. In another implementation, computing the weights includes a non-linear optimization.

The weights are applied to the associated n FACS action units to generate a weighted activation. The weighted activation is transferred onto a digital facial model rigged with a facial muscle system.

In one implementation, the facial poses of an animated character, corresponding to FACS poses, are generated by an artist using a facial rig. In another implementation, a digital facial model setup is based on IMAGEWORKS™ proprietary character facial system. The character facial system helps pull and nudge vertices of the digital facial model so that resulting deformations are consistent with the aspects of a human face.

Figure 10A:
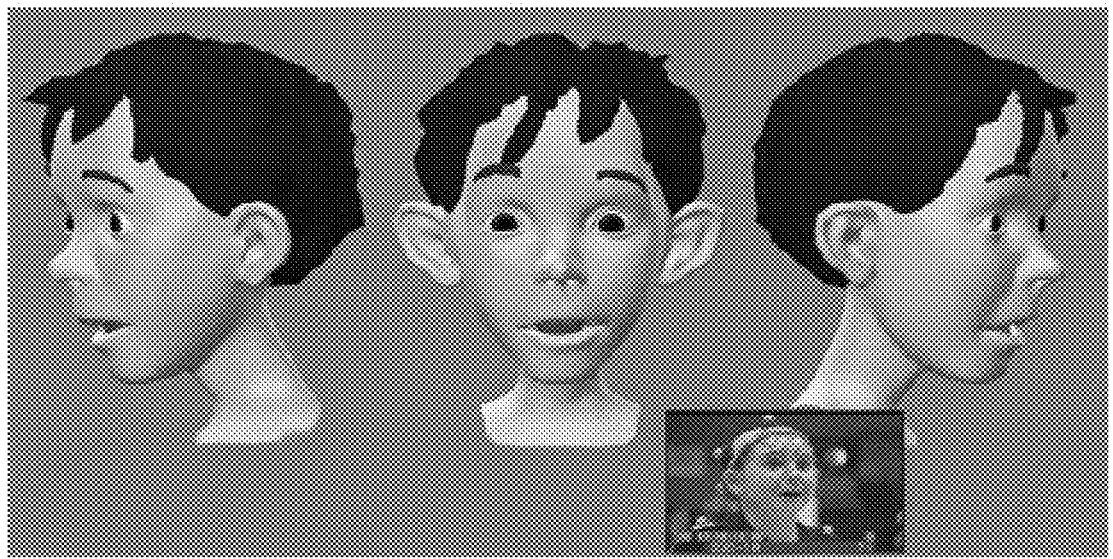
FIG. 10A is an image depicting an example lip articulation for the partially-opened mouth of an animated character.
Figure 10B:
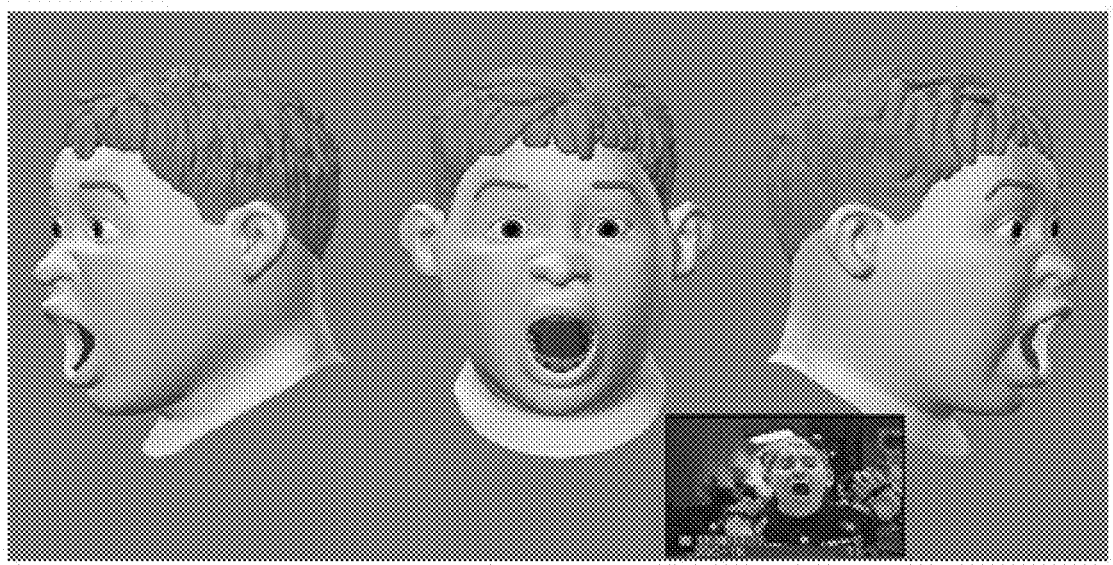
FIG. 10B is an image depicting an example lip articulation for the fully-opened mouth of an animated character.
Figure 10C:
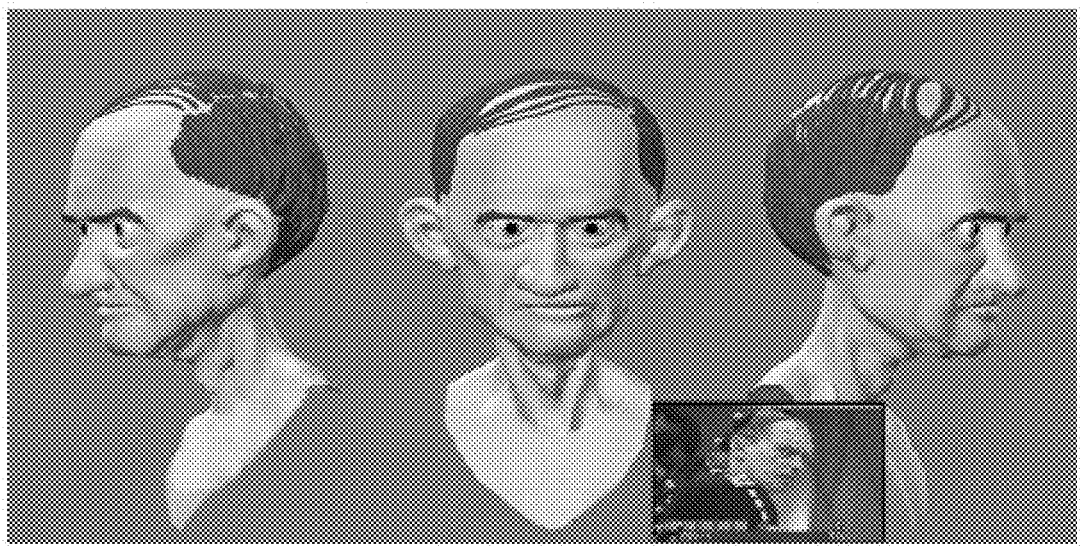
FIG. 10C is an image depicting an example lip articulation for the closed mouth of an animated character.

The digital facial model includes different fascia layers blended to create a final facial deformation on the digital facial model. The fascia layers in one implementation include a muscle layer that allows facial muscle deformations, a jaw layer that allows jaw movement, a volume layer that control skin bulges in different facial areas, and an articulation layer for pronounced lip movement. The muscle layer includes skull patches with muscle controls that deform the face. The muscle controls are activated by weighted activations generated from MOCAP data. The jaw layer helps to control movements of the jaw of the digital facial model. The volume layer adds volume to the deformations occurring on the digital facial model. It aids in modeling wrinkles and other facial deformations, which can be triggered by weighted activations generated from MOCAP data. The articulation layer relates to the shape of the lips as they deform. In particular, it aids in controlling the roll and volume of lips, essential when the lips thin out or pucker in facial expressions. FIG. 10A is an image depicting an example lip articulation for the partially-opened mouth of an animated character. FIG. 10B is an image depicting an example lip articulation for the fully-opened mouth of an animated character. FIG. 10C is an image depicting an example lip articulation for the closed mouth of an animated character.

The fascia layers can be constructed onto the digital facial model. Incoming MOCAP data are mapped, or retargeted, onto the digital facial model as weighted activations that trigger the fascia layers. As discussed above, an incoming frame of MOCAP data is analyzed in the space of all of the action units (i.e., facial basis vectors) of the FACS matrix. The resulting weights quantify the proportional influence that each of the action units of the FACS matrix exerts in triggering the fascia layers. However, because the weights are obtained using mathematical methods (e.g., linear and non-linear optimization), the resulting expression created on the digital facial model sometimes fails to replicate facial deformations naturally recognized as articulating a desired expression. That is, although the facial retargeting achieved using the various mapping solutions may be optimally correct in a mathematical sense, the resulting facial expressions may not conform to the desired look or requirements of a finalized animation shot.

There can be several reasons for these nonconforming results. The actor may not perform according to the calibration poses provided initially for the FACS matrix, thus causing the action units to be non-representative of the actor's performance; retargeting inconsistencies sometimes arise when mapping mathematically correct marker data to an aesthetically designed face; the digital facial model may conform poorly to the actor's face; marker placements on the actor's face may differ adversely from day to day; and/or the desired animation may be inconsistent with the actions performed by the actor, such as when a desired expression is not present in the MOCAP data, or an exaggeration of the captured expression is attempted.

A multidimensional tuning system can use tuning feedback provided by an animator to reduce the effects of incorrect mathematical solutions. This is mathematically achievable since the facial basis vectors of the FACS matrix mimic real human expressions and can therefore be easily edited by the animator. After a FACS solve and retargeting is performed, the animator can adjust one or more selected frames (e.g., five to ten frames having unacceptable results) to achieve a "correct look" in the animator's artistic judgment. The adjustment is performed by modifying the weights resulting from the FACS solves associated with the poses in the selected frames. The modified poses are then used to update and optimize the FACS matrix. The updated FACS matrix thus includes action units based on actual marker ranges of motion as well as the modified weights. In one implementation, non-linear mathematical optimization tools are used to optimize the action unit pose data and activation levels. In the tuning process, artistic input is taken from the artist or user by modifying weights so that the overall expression suite closely matches the desires of a user. This is done on a few frames. The tuning process then learns from all the changed weights resulting in a new/modified FACS matrix. The modified FACS matrix is used in subsequent solves on the MOCAP data in order to apply the adjusted weighting provided by the animator on the poses in the selected frames. The modifications in the FACS library are also incorporated in the other frames, generating improved results over the entire animation. Further, should the modified FACS library generate results that are still not satisfactory, the animator can perform further adjustments to build updated FACS libraries.

Figure 11:
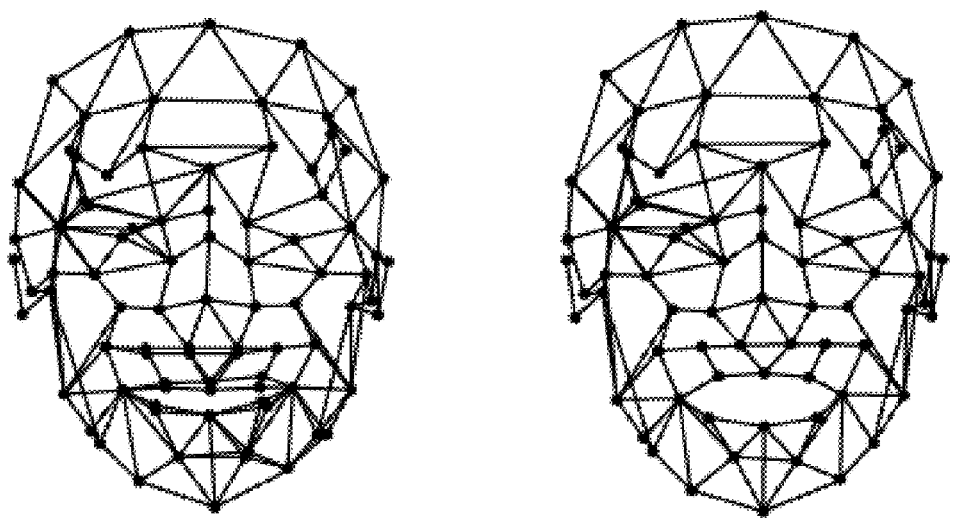
FIG. 11 depicts an example FACS pose before and after a tuning phase.

FIG. 11 depicts an example of FACS poses before and after a tuning operation. The left image of FIG. 11 shows a lip shut phoneme position overlaid before and after tuning. The right image of FIG. 11 shows a lip tightener pose before and after tuning. The new marker positions (in black) have been adjusted to an optimized location based on the animator's corrected weighting values over a few tuned frames. This change is shown on the two poses depicted, but often occurs on more poses depending on the nature of the animator's input adjustments.

Figure 12:
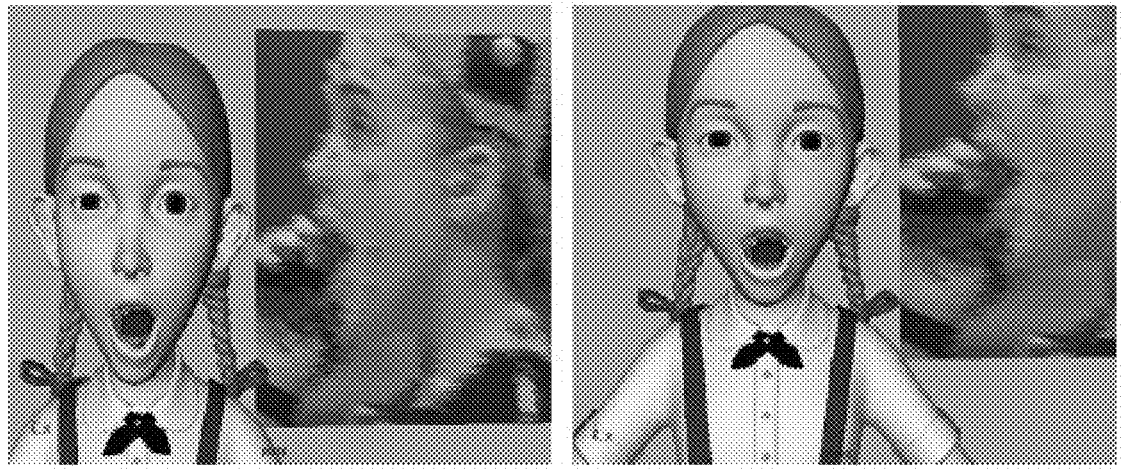
FIG. 12 depicts an example of solved animation frames before and after a tuning operation.
Figure 13:
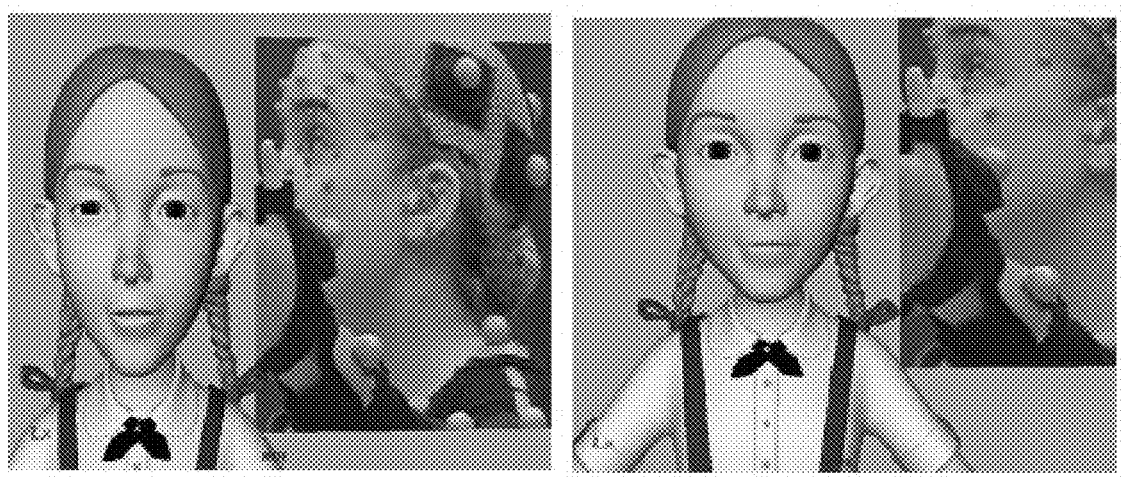
FIG. 13 depicts another example of solved animation frames before and after a tuning operation.

FIG. 12 and FIG. 13 depict examples of solved animation frames before and after a tuning operation. In FIG. 12, the left image depicts a frame solved using the initial, calibrated FACS matrix, and the right image depicts the same frame solved using the modified (tuned) FACS matrix. The resulting effect is concentrated on the right lip tightener of the pose. In FIG. 13, the left image depicts a frame solved using the initial, calibrated FACS matrix, and the right image depicts the same frame solved using the modified (tuned) FACS matrix. The actor is uttering the beginning of the word "please." The solve using the initial, calibrated FACS matrix does not show the lips closed to say the first syllable whereas the solve using the modified FACS matrix does show the lips closed.

FIG. 1 is a flowchart illustrating a method 100 of animating a digital facial model. At 110, action units are defined for a FACS matrix. In one implementation, as discussed above, the FACS matrix includes 64 action units, each action unit defining groups of facial muscle groups working together to generate a particular facial expression. Action units can further be broken down to represent left and right sides of the face, and thus compose asymmetrical facial poses.

The action units of the FACS matrix are calibrated, at 120. Typically, each actor has a unique, individualized FACS matrix. In one implementation, each action unit is calibrated by motion capturing the actor's performance of the pose corresponding to the action unit. Facial marker data are captured as described above, FACS cleaned and stabilized, and assigned to the FACS matrix in correspondence with the particular action unit. In another implementation, the actor performs the pose in an extreme manner to establish expected bounds for marker excursions when the pose is executed during a performance.

After the calibration (at 120) is completed, MOCAP data are acquired during a performance. New facial pose data are received one frame at a time, at 130, as the MOCAP data are generated during performance and acquisition. The frame of MOCAP data comprises volumetric (3-D) data representing the facial marker positions in the capture space. In one implementation, the volumetric data are FACS cleaned and stabilized, as described above, before being received (at 130).

Weights are determined, at 140, which characterize a weighted combination of action units approximating the new facial pose data. Action units represent activations of certain facial muscle groups, and can be regarded as facial basis vectors, as discussed above. As such, one or more action units—including all of the action units in the FACS matrix—are used as components which, in a weighted combination, approximate the new facial pose data. That is, the new facial pose data are characterized as some combination of the pre-defined action units in the FACS matrix. Determining the weights involves optimally fitting a weighted combination of the facial pose data associated with each action unit to the new facial pose data. In one implementation, a linear optimization, such as a least squares fit, is used to compute the optimal combination of weights. In another implementation, a non-linear optimization is used to perform the fit.

Once the weights are determined (at 140) a weighted activation is generated, at 150. In one implementation, the weights are applied to muscle group activations associated with each action unit and the resulting activations are combined to generate a weighted activation. The weighted activation is then applied to the digital facial model, at 160.

If more MOCAP data frames are available for processing (determined at 170), then a new frame of MOCAP data is received, at 130, and the process continues as described above. If no more MOCAP data frames are available, then the process continues by recalibrating the FACS matrix, at 180. In one implementation, recalibrating the FACS matrix (at 170) is undertaken while more MOCAP data frames are available, on command by the user.

Recalibrating the FACS matrix (at 170) can include receiving adjustments to the weighted activation from the user. For example, if the user desires a modification to a pose in a particular frame, the user may select the frame and adjust the weights used to generate the weighted activation. Since the weights correspond to predefined action units, and the action units correspond to distinct facial movements (i.e., activations of certain facial muscle groups), the pose can be adjusted by manipulating the weights corresponding to facial muscle groups controlling the particular aspect of the pose intended to be changed. For example, where movement of the left corner of the mouth is defined in an action unit, the left corner of the mouth of the digital model is moved to a more extreme position, or less extreme position, by manipulating the weight associated with that action unit. Thus, an animator or artist, for example, is able to control various aspects of a facial expression by manipulating natural components of the face (i.e., action units).

Figure 2:
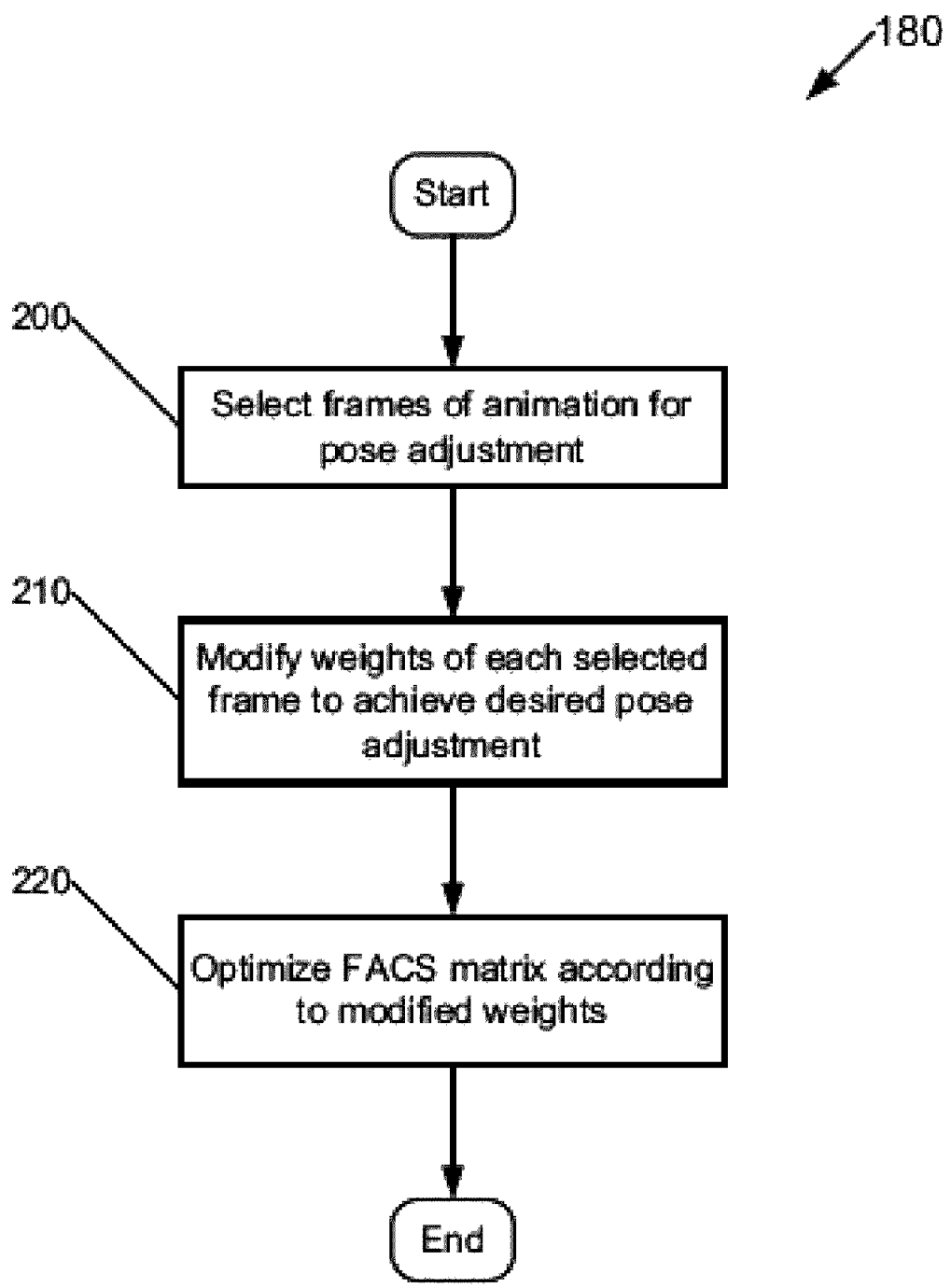
FIG. 2 is a flowchart illustrating a method of recalibrating action units of a FACS matrix.

FIG. 2 is a flowchart illustrating the recalibration of action units of a FACS matrix (at 180). At 200, frames containing poses on the digital facial model which the user wishes to modify are selected. For example, out of thousands of data frames, five to ten frames might be selected for modification of the facial data. For each selected frame, the weights are modified to generate the desired facial pose, at 210. In one implementation, the corresponding action units are modified accordingly to include the adjusted weights, and are exported to the FACS matrix. Thus, the FACS matrix is updated with new versions of those particular action units, modified to accommodate the user's expectations for the particular facial poses associated with them. In another implementation, the same data set originally processed according to the method illustrated in FIG. 1 is reprocessed using the updated FACS matrix. While the data of the particular frames that were adjusted will now be retargeted to the digital facial model in a more desirable manner, other facial pose data for which the modified action units nevertheless play a significant role in terms of weighting will also be retargeted in such a way as to improve the overall quality of the animation.

Figure 3:
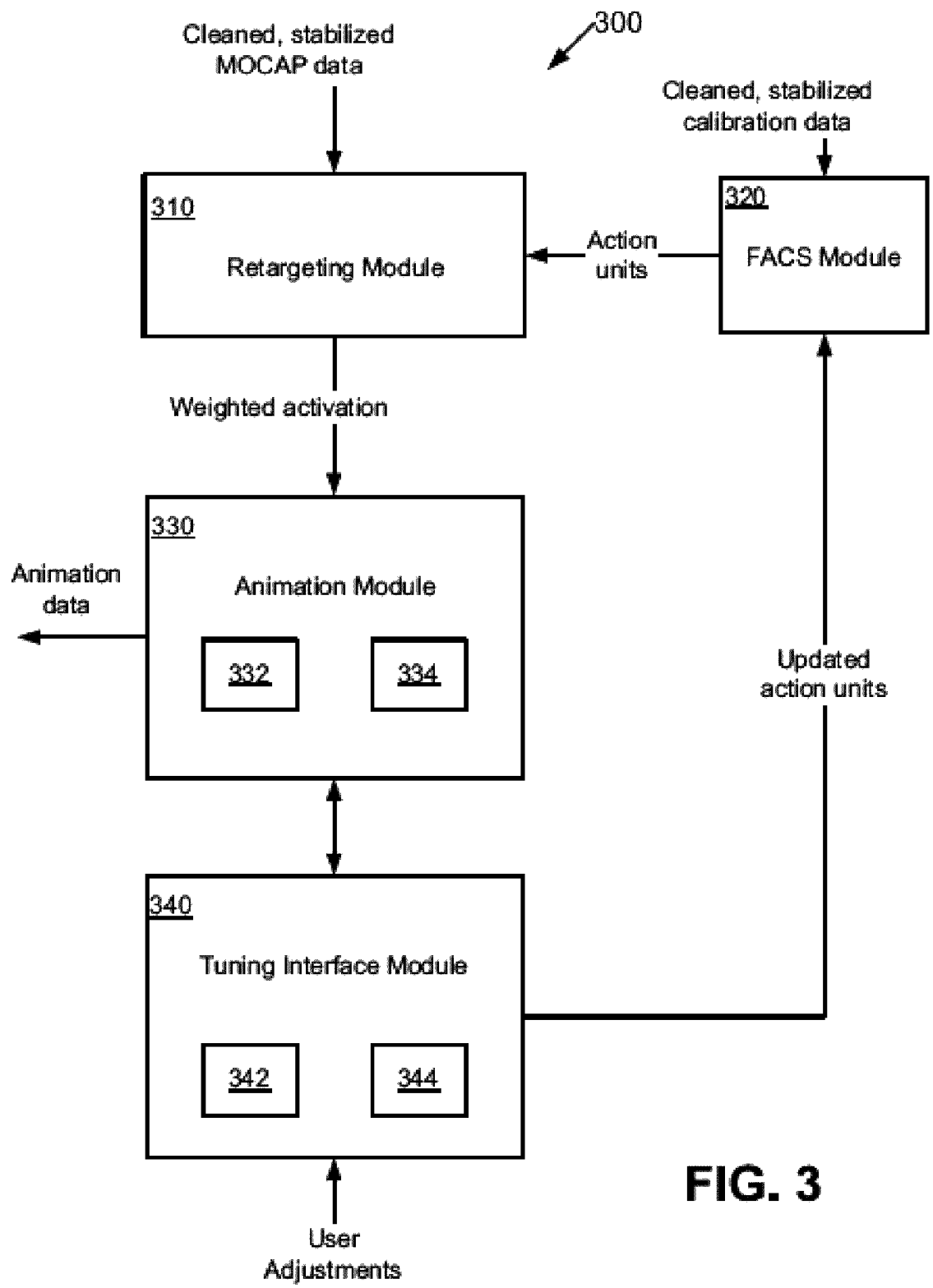
FIG. 3 is a functional block diagram of a system for animating a digital facial model.

FIG. 3 is a functional block diagram of a system 300 for animating a digital facial model, including a retargeting module 310, a FACS module 320, an animation module 330, and a tuning interface module 340.

The retargeting module 310 receives cleaned, stabilized facial MOCAP data, and action units from the FACS module 320. The FACS module 320 receives cleaned, stabilized calibration data, and maintains a plurality of action units in a FACS matrix, the functionality of which is described above. The cleaned, stabilized calibration data are used to calibrate the action units of the FACS matrix maintained by the FACS module 320. The retargeting module 310 generates a weighted activation, according to weights determined therein characterizing a weighted combination of action units which approximates the facial pose data represented by the received facial MOCAP data.

The animation module 330 receives a weighted activation and generates animation data. The animation data include the results of activating a digital facial model according to the weighted activation. In one implementation, the animation module 330 maintains a digital facial model, and includes a rigging unit 332, which is used to generate fascia layers on the digital facial model. In particular, the fascia layers are components of the digital facial model to which the weighted activation is applied to generate the animation data. In another implementation, the animation module 330 includes a transfer unit 334 which applies the weighted activation to the fascia layers of the digital facial model.

A tuning interface module 340 is configured to receive input user adjustments, and is used by a user to generate recalibrated action units for the FACS matrix maintained by the FACS module 320. In one implementation, the tuning interface module 340 includes a frame selection unit 342 used by a user to select animation data frames in which the resulting pose of the digital facial model is deemed unsatisfactory. The frame selection unit 342 can be used to select any number of frames from the frames of animation data. In another implementation, the tuning interface module 340 includes a weight modification unit 344, which is used by the user to modify the weights corresponding to appropriate action units for the purpose of adjusting a pose of the digital facial model to achieve a desired result. Once the weights have been adjusted to the user's satisfaction, the tuning interface module 340 conveys information regarding the adjusted action unit to the FACS module 320, where the information is received and used to update the FACS matrix.

Figure 4:
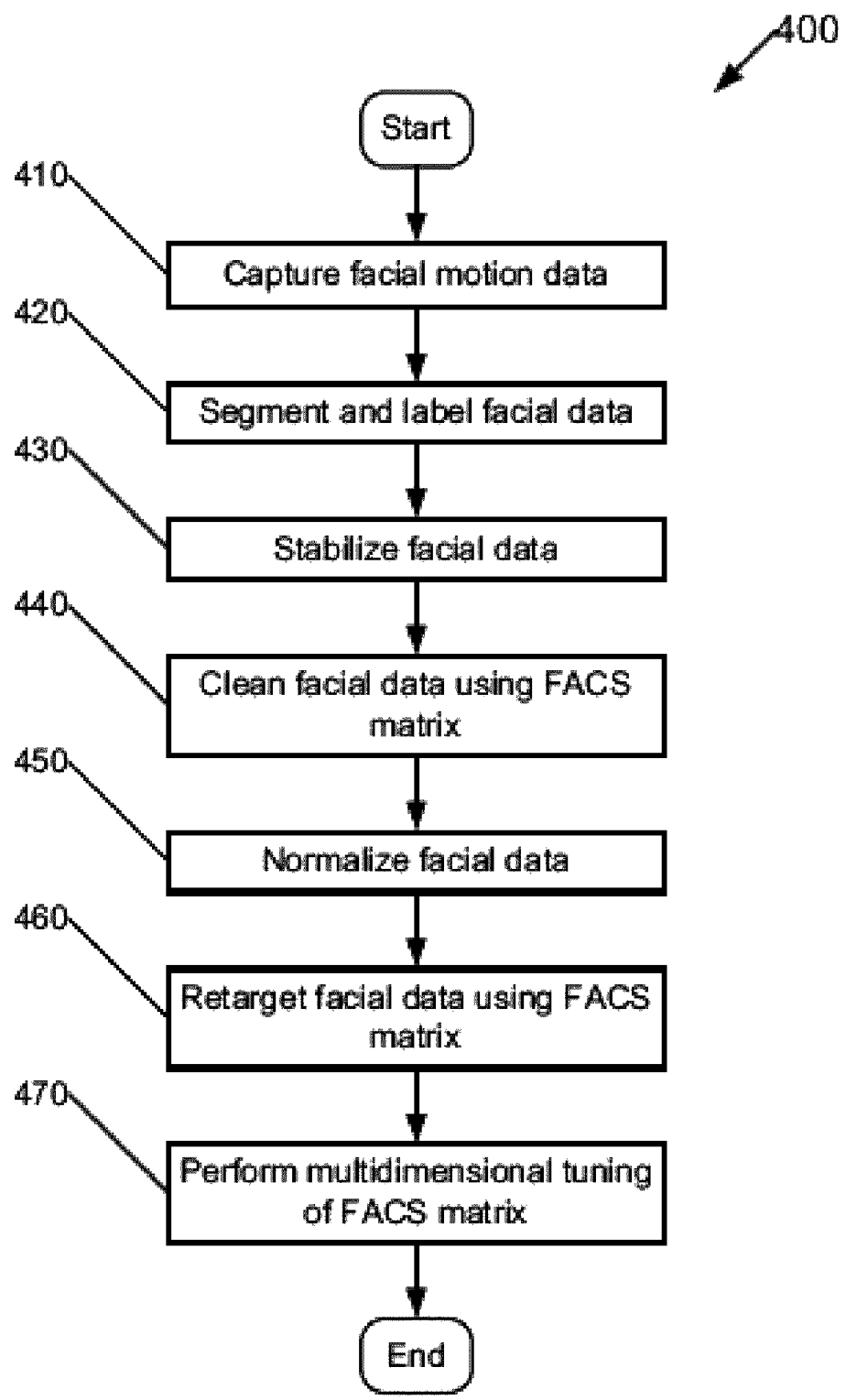
FIG. 4 is a flowchart illustrating a method of performance driven facial animation.

FIG. 4 is a flowchart illustrating a method 400 of performance driven facial animation. At 410, facial motion data are captured. In one implementation, as discussed above, MOCAP cameras disposed about a capture space are used to capture infra-red light reflected by reflective markers coupled to an actor's body and face. The reflected light appears as white dots on a black background, where the white dots represent the markers in the images. The images from the MOCAP cameras are used to reconstruct sequential frames of volumetric data in which the marker positions are located. The facial data are segmented from the volumetric data (essentially by filtering out the body data) and are labeled, at 420. The facial data are stabilized, as discussed above, at 430. The facial data are then cleaned using a FACS matrix, at 440. The facial data are then normalized, at 450, to remove positional offset discrepancies due to day-to-day variations in marker placement, for example.

At 460, the facial data are retargeted frame-by-frame to a digital facial model using weighted combinations of action units of the FACS matrix. A multidimensional tuning is then performed by a user, at 470, where action units comprising a pose on the digital facial model are modified by the user to achieve a more desirable result. The modified action units are incorporated into the FACS matrix as updates. The updated FACS matrix is then used to generate a higher quality of animation output.

Figure 14A:
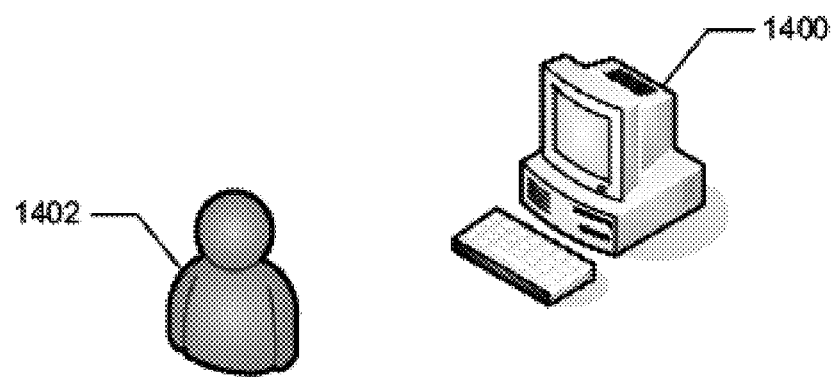
FIG. 14A illustrates a representation of a computer system and a user.

FIG. 14A illustrates a representation of a computer system 1400 and a user 1402. The user 1402 can use the computer system 1400 to process and manage performance driven facial animation. The computer system 1400 stores and executes a facial animation system 1416, which processes facial MOCAP data.

Figure 14B:
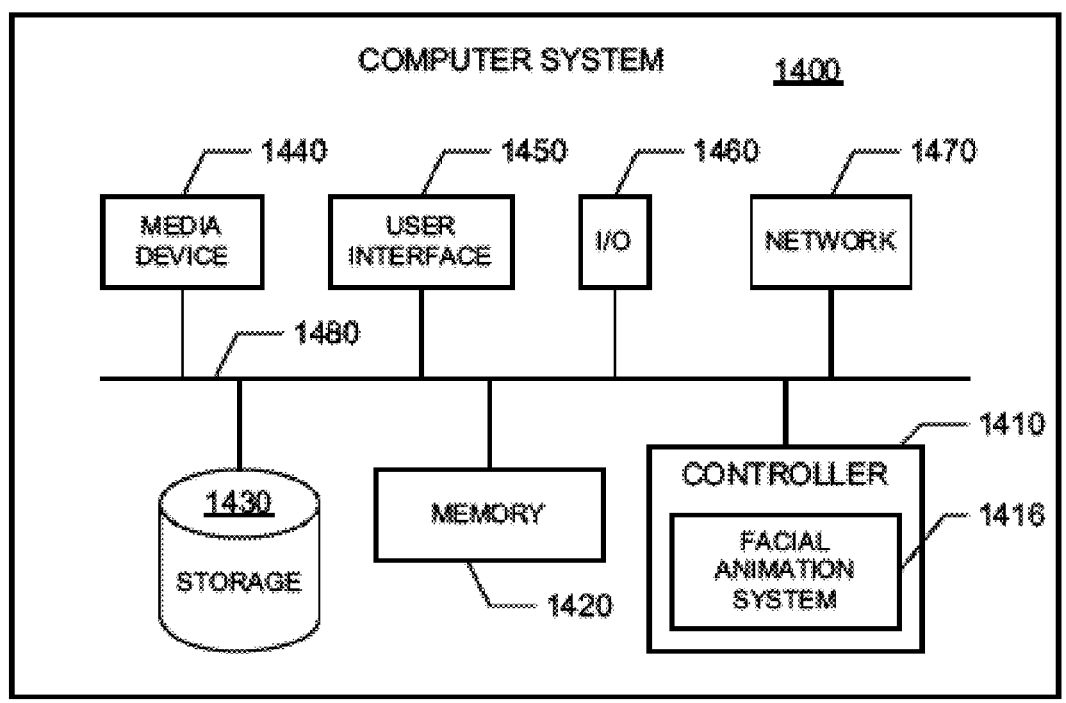
FIG. 14B is a functional block diagram illustrating the computer system hosting a facial animation system.

FIG. 14B is a functional block diagram illustrating the computer system 1400 hosting the facial animation system 1416. The controller 1410 is a programmable processor which controls the operation of the computer system 1400 and its components. The controller 1410 loads instructions from the memory 1420 or an embedded controller memory (not shown) and executes these instructions to control the system. In its execution, the controller 1410 provides the facial animation system 1416 as a software system. Alternatively, this service can be implemented as separate components in the controller 1410 or the computer system 1400.

Memory 1420 stores data temporarily for use by the other components of the computer system 1400. In one implementation, memory 1420 is implemented as RAM. In another implementation, memory 1420 also includes long-term or permanent memory, such as flash memory and/or ROM.

Storage 1430 stores data temporarily or long term for use by other components of the computer system 1400, such as for storing data used by the facial animation system 1416. In one implementation, storage 1430 is a hard disk drive.

The media device 1440 receives removable media and reads and/or writes data to the inserted media. In one implementation, the media device 1440 is an optical disc drive.

The user interface 1450 includes components for accepting user input from the user of the computer system 1400 and presenting information to the user. In one implementation, the user interface 1450 includes a keyboard, a mouse, audio speakers, and a display. The controller 1410 uses input from the user to adjust the operation of the computer system 1400.

The I/O interface 1460 includes one or more I/O ports to connect to corresponding I/O devices, such as external storage or supplemental devices (e.g., a printer or a PDA). In one implementation, the ports of the I/O interface 1460 include ports such as: USB ports, PCMCIA ports, serial ports, and/or parallel ports. In another implementation, the I/O interface 1460 includes a wireless interface for communication with external devices wirelessly.

The network interface 1470 includes a wired and/or wireless network connection, such as an RJ-45 or "Wi-Fi" interface (including, but not limited to 802.11) supporting an Ethernet connection.

The computer system 1400 includes additional hardware and software typical of computer systems (e.g., power, cooling, operating system), though these components are not specifically shown in FIG. 14B for simplicity. In other implementations, different configurations of the computer system can be used (e.g., different bus or storage configurations or a multi-processor configuration).

It will be appreciated that the various illustrative logical blocks, modules, and methods described in connection with the above described figures and the implementations disclosed herein have been described above generally in terms of their functionality. In addition, the grouping of functions within a module or subunit is for ease of description. Specific functions or steps can be moved from one module or subunit to another without departing from the invention.

One implementation includes one or more programmable processors and corresponding computer system components to store and execute computer instructions, such as to provide the various subsystems of a motion capture system (e.g., calibration, matrix building, cleanup, stabilization, normalization, retargeting, and tuning using FACS techniques).

Additional variations and implementations are also possible. For example, the animation supported by the motion capture system could be used for film, television, advertising, online or offline computer content (e.g., web advertising or computer help systems), video games, computer games, or any other animated computer graphics video application. In another example, different types of motion capture techniques and markers can be used, such as optical markers other than infrared, active optical (e.g., LED), radio (e.g., RFID), paint, accelerometers, deformation measurement, etc. In another example, a combination of artistic input and mathematical processes is used to model a face which is activated using retargeting solutions. In a further example, mathematical, heuristic, and aesthetically based rules are developed to enhance the fidelity of muscle and skin movements on the digital facial model when the animated character talks.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Thus, it will be understood that the description and drawings presented herein represent implementations of the invention and are therefore representative of the subject matter which is broadly contemplated by the present invention. It will be further understood that the scope of the present invention fully encompasses other implementations that may become obvious to those skilled in the art and that the scope of the present invention is accordingly limited by nothing other than the appended claims.

What is claimed is:

1. A method of animating a digital facial model, the method comprising:
    defining a plurality of action units;
    calibrating each action unit of said plurality of action units via an actor's performance,
        wherein said each action unit includes a second facial pose data and an activation,
        wherein said activation of said each action unit is directed to a fascia layer such that a plurality of fascia layers are triggered by activations of said plurality of action units, and
        wherein said calibrating each action unit includes calibrating said second facial pose data of said each action unit using calibration pose data derived from a calibration performance corresponding with said each action unit;
    capturing and stabilizing first facial pose data by capturing signal from all facial markers, performing a gross stabilization using a first plurality of markers that do not move due to facial expressions including markers coupled to head, ears and nose bones, and performing a fine stabilization by determining movements of all facial markers relative to the first plurality of markers;
    determining a plurality of weights, each weight of said plurality of weights uniquely corresponding to said each action unit, said plurality of weights characterizing a weighted combination of said plurality of action units, said weighted combination approximating said first facial pose data;
    generating a weighted activation by combining the results of applying said each weight to said each action unit;

applying said weighted activation by triggering said plurality of fascia layers to be constructed onto said digital facial model; and recalibrating at least one action unit of said plurality of action units using input user adjustments to said weighted activation.

2. The method of claim 1, further comprising cleaning and stabilizing said calibration pose data.

3. The method of claim 1, wherein said weighted combination includes
a weighted combination of said second facial pose data of said each action unit.

4. The method of claim 3, wherein said determining a plurality of weights includes
an optimization of a correspondence between said first facial pose data and said weighted combination of said second facial pose data.

5. The method of claim 4, wherein said optimization includes a linear optimization.

6. The method of claim 5, wherein said linear optimization includes a least-squares method.

7. The method of claim 4, wherein said optimization includes a non-linear optimization.

8. The method of claim 1, wherein generating a weighted activation includes
combining the results of applying said each weight to said activation of said each action unit.

9. The method of claim 1, wherein said recalibrating at least one action unit includes
recalibrating said second facial pose data.

10. The method of claim 1, wherein said recalibrating at least one action unit includes
recalibrating said activation.

11. The method of claim 1, wherein said fascia layer includes a muscle layer.

12. The method of claim 1, wherein said fascia layer includes a jaw layer.

13. The method of claim 1, wherein said fascia layer includes a volume layer.

14. The method of claim 1, wherein said fascia layer includes an articulation layer.

15. The method of claim 1, wherein said plurality of action units comprises a FACS matrix.

16. A method of animating a digital facial model, the method comprising:
defining a plurality of action units,
wherein each action unit of said plurality of action units includes second facial pose data and an activation, and
wherein said activation of said each action unit is directed to a fascia layer such that a plurality of fascia layers are triggered by activations of said plurality of action units;
calibrating said second facial pose data using calibration pose data derived from a plurality of captured calibration performances, each calibration performance of said plurality of captured calibration performances corresponding with said each action unit;
stabilizing said second facial pose data by performing a gross stabilization using a first plurality of markers that do not move due to facial expressions including markers coupled to head, ears and nose bones, and performing a fine stabilization by determining movements of all facial markers relative to the first plurality of markers;
deriving first facial pose data from another calibration performance of said plurality of captured calibration performances;
determining a plurality of weights, each weight of said plurality of weights uniquely corresponding to said each action unit, said plurality of weights characterizing a weighted combination of said first facial pose data, said weighted combination approximating said first facial pose data;
generating a weighted activation by combining the results of applying said each weight to said activation;
applying said weighted activation by triggering said plurality of fascia layers to be constructed onto said digital facial model; and
recalibrating said second facial pose data and said activation using input user adjustments to said weighted activation.

17. A system for retargeting facial motion capture data to a digital facial model, the system comprising:
a FACS module to manage a plurality of action units;
a calibration module to calibrate each action unit of said plurality of action units via an actor's performance,
wherein said each action unit includes second facial pose data and an activation,
wherein said activation of said each action unit is directed to a fascia layer such that a plurality of fascia layers are triggered by activations of said plurality of action units,
wherein said calibration module calibrates each action unit by calibrating said second facial pose data using calibration pose data derived from a calibration performance corresponding with said each action unit, and
wherein said calibration module cleans and stabilizes said second facial pose data to facial expressions including markers coupled to head, ears and nose bones, and performing a fine stabilization by determining movements of all facial markers relative to the first plurality of markers;
a retargeting module to generate at least one weighted activation for said digital facial model using said facial motion capture data and said plurality of action units,
wherein said digital facial model includes first facial pose data;
an animation module to generate a facial animation frame by applying said at least one weighted activation by triggering said plurality of fascia layers to be constructed onto said digital facial model; and
a tuning interface module to generate recalibrated action units for said FACS module in accordance with input user adjustments to said facial animation,
wherein said tuning interface module includes a weights modification unit to adjust said at least one weighted activation to achieve a desired pose of said digital facial model.

18. The system of claim 17, wherein said animation module includes a rigging unit to generate said digital facial model.

19. The system of claim 18, wherein said rigging unit generates at least one fascia layer on said digital facial model.

20. The system of claim 19, wherein said animation module includes
a transfer module to apply said at least one weighted activation to said at least one fascia layer.

21. The system of claim 17, wherein said tuning interface module includes
a frame selection unit to select said facial animation frame for tuning.

22. A method of digital facial animation, the method comprising:
defining a plurality of action units in a FACS matrix;
calibrating each action unit of said plurality of action units via an actor's performance, wherein said each action unit includes a second facial pose data and an activation, wherein said activation of said each action unit is directed to a fascia layer such that a plurality of fascia layers are triggered by activations of said plurality of action units, and wherein said calibrating each action unit includes calibrating said second facial pose data using calibration pose data derived from a calibration performance corresponding with said each action unit;

capturing facial motion data including first facial pose data;

labeling said facial motion data;

stabilizing said facial motion data by performing a gross stabilization using a first plurality of markers that do not move due to facial expressions including markers coupled to head, ears and nose bones, and performing a fine stabilization by determining movements of all facial markers relative to the first plurality of markers;

cleaning said facial motion data using said FACS matrix;

normalizing said facial motion data;

retargeting said facial motion data by triggering said plurality of fascia layers to be constructed onto a digital facial model using said FACS matrix; and performing multidimensional tuning of said FACS matrix.

* * * * *